(12) United States Patent
Tabuchi

(10) Patent No.: US 6,212,533 B1
(45) Date of Patent: *Apr. 3, 2001

(54) HYPER-MEDIA DOCUMENT MANAGEMENT SYSTEM HAVING NAVIGATION MECHANISM

(75) Inventor: Masahiro Tabuchi, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,446

(22) Filed: Feb. 18, 1997

(30) Foreign Application Priority Data

Feb. 16, 1996 (JP) .................................................. 8-029597

(51) Int. Cl.⁷ .................................................. G06F 17/21
(52) U.S. Cl. .......................... 707/501; 707/511; 707/523
(58) Field of Search .................... 345/329–332, 345/335, 356, 357; 395/200.34, 200.35; 707/501, 511, 513, 514, 523; 709/203, 204

(56) References Cited

U.S. PATENT DOCUMENTS

| | | | |
|---|---|---|---|
| 4,899,136 | * | 2/1990 | Beard et al. ............................ 340/706 |
| 5,008,853 | * | 4/1991 | Bly et al. ............................... 364/900 |
| 5,204,947 | * | 4/1993 | Bernstein et al. ..................... 395/157 |
| 5,297,249 | * | 3/1994 | Bernstein et al. ..................... 395/156 |
| 5,423,043 | * | 6/1995 | Fitzpatrick et al. .................. 395/700 |
| 5,634,062 | * | 5/1997 | Shimizu et al. ...................... 395/762 |
| 5,708,780 | * | 1/1998 | Levergood et al. .................. 709/229 |
| 5,752,246 | * | 5/1998 | Rogers et al. .......................... 707/10 |
| 5,793,966 | * | 8/1998 | Amstein et al. ...................... 709/203 |
| 5,799,292 | * | 8/1998 | Hekmatpour ........................... 706/11 |
| 5,801,702 | * | 9/1998 | Dolan et al. .......................... 345/357 |
| 5,809,317 | * | 9/1998 | Kogan et al. ......................... 395/762 |
| 5,862,325 | * | 1/1999 | Reed et al. ...................... 395/200.31 |
| 5,890,176 | * | 3/1999 | Kish et al. ............................ 707/511 |
| 5,890,177 | * | 3/1999 | Moody et al. ........................ 707/511 |
| 5,893,122 | * | 8/1998 | Tabuchi ................................ 707/501 |
| 5,950,215 | * | 8/1998 | Tabuchi ................................ 707/515 |
| 6,023,175 | * | 7/2000 | Burkes et al. ........................ 707/514 |
| 6,092,090 | * | 7/2000 | Payne et al. .......................... 707/530 |

* cited by examiner

Primary Examiner—Joseph H. Feild
(74) Attorney, Agent, or Firm—Sughrue, Mion, Zinn, Macpeak & Seas, PLLC

(57) ABSTRACT

A hyper-media document management system manages a virtual hyper-media document having data such as images, figures, texts, vocal sounds and animations. The hypermedia document management system has a virtual node manager for managing virtual node and a virtual link manager for managing virtual link. By introducing the virtual node and link, each application program is limited to refer to or modify the virtual hyper-media document, independently.

17 Claims, 13 Drawing Sheets

LINK TABLE

| LINK ID | NODE ID |
|---------|---------|
|         |         |
|         |         |
|         |         |
|   ⋮     |   ⋮     |
|         |         |

61        62

HYPER-MEDIA DOCUMENT MANAGEMENT SYSTEM HAVING NAVIGATION MECHANISM

BACKGROUND OF THE INVENTION

The present invention relates to a hyper-media document management system, and more particularly to a hyper-media document management system having navigation mechanism.

A hyper-media document is a document having nodes and links. The nodes indicate media data such as images, figures, texts, vocal sounds and animations. The links indicate relationship between the nodes. In the hyper-media document, mechanism of tracing between the nodes is called "navigation". A hyper-media management system manages the navigation mechanism.

A conventional hyper-media management system has a node manager and a link manager. The node manager reads or writes a node identifier. The link manager reads or writes a link identifier. The node identifier may include node types. The link identifier may includes link types.

In the conventional hyper-media document management system, since interface between an application program and a hyper-media document is different depending on the application program, some functions must be implemented for each application program. For example, user verification function is required for multi-user environment. Moreover, distributed access function is required for referring to a node maintained by another system on the network. Since these functions are defined and implemented by each application program, it is difficult to share the hyper-media document among the application programs. For example, an evaluation scheme of an access condition defined by one application program may be different from another application program's.

SUMMARY OF THE INVENTION

In view of the foregoing problem of the conventional system, an object of the present invention is to provide virtual hyper-media documents for being shared by different application programs. The hyper-media documents are used for changing a displaying form of the hyper-media document, limiting an accessible range, and referring to a part of the document placed on the network for the navigation mechanism.

In a hyper-media document management system according to a first aspect of the present invention, a document manager manages a hyper-media document. A virtual document manager manages a virtual hyper-media document created from the hyper-media document. A navigation manager traces the hyper-media document and the virtual hyper-media document.

With the unique and unobvious structure of the present invention, the hyper-media document management system provides a virtual hyper-media documents to be shared by application programs.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

Description will be given of preferred embodiments of a hyper-media document system of the present invention in detail with reference to the accompanying drawings.

Figure 1:
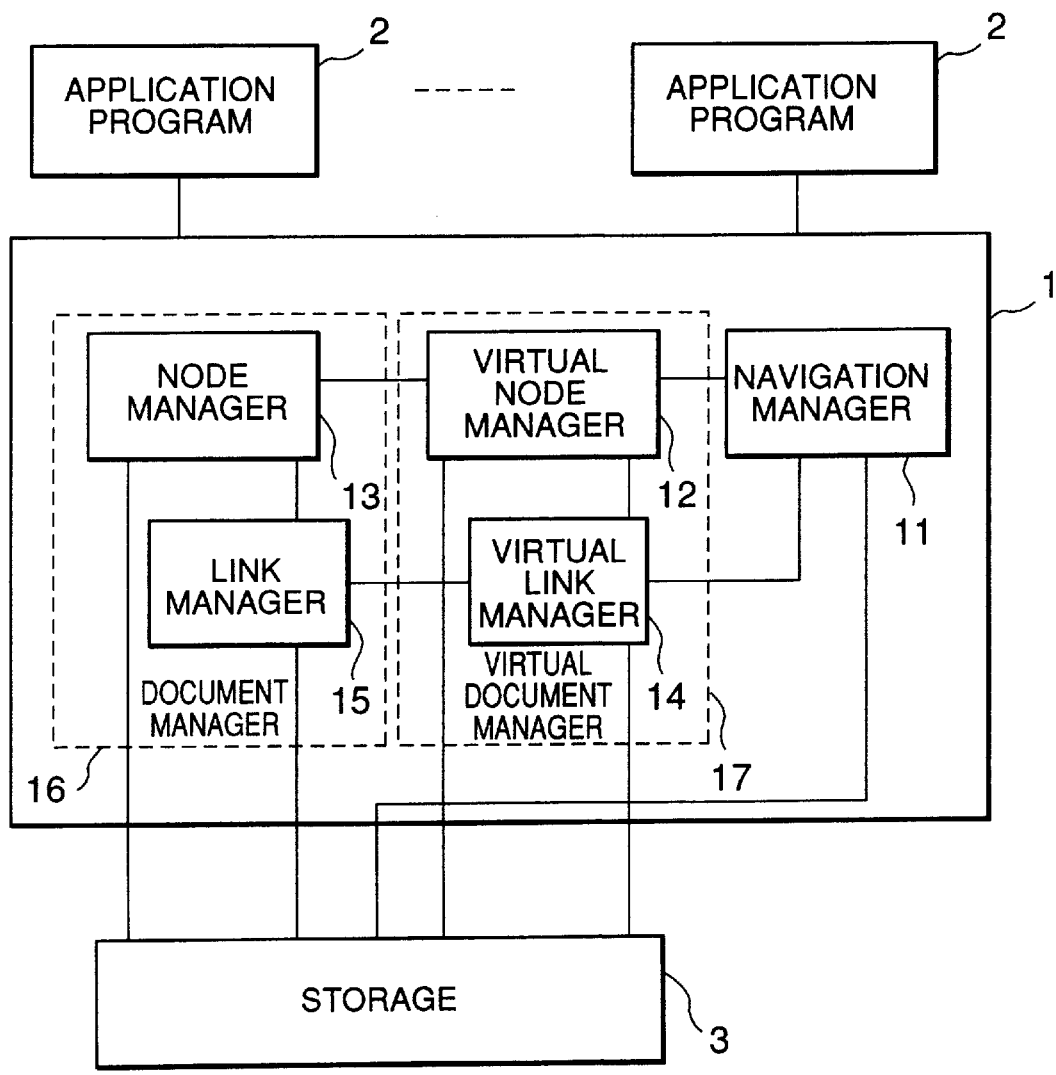
FIG. 1 is a block diagram showing the configuration of a first embodiment of a hyper-media document management system according to the present invention.

Referring to FIG. 1 showing a first embodiment of the invention, a hyper-media document management system 1 is located between a storage 3 and application programs 2. The storage 3 stores hyper-media documents having nodes (i.e., images, figures, texts, vocal sounds and animations) and links (i.e., relationship between the nodes). The application programs 2 read and write the hyper-media documents stored in the storage 3.

The hyper-media document system 1 has a document manager 16 for managing nodes and links, a virtual document manager 17 for managing virtual nodes and virtual links, and a navigation manager 11 for managing navigation mechanism. The document manager 16 has a node manager 13 for managing nodes and a link manager 15 for managing links. The virtual document manager 17 has a virtual node manager 12 for managing virtual nodes and a virtual link manager 14 for managing virtual links.

The node manager 13 defines media data as a node, generates a corresponding node identifier and stores both the media data and the node identifier in the storage 3 while they are related to each other. The node manager 13 also retrieves the corresponding media data on the basis of the applied node identifier.

The link manager 15 defines pairs of applied node identifiers as a link between nodes and stores the corresponding link identifier and the link in the storage 3. The link manager 15 retrieves the corresponding link from the applied link identifier.

The virtual node manager 12 defines an instance of a node as a virtual node. The virtual node manager 12 stores the virtual node in the storage 3 together with the virtual node identifier, and retrieves or deletes the virtual node.

The virtual link manager 14 defines a pair of applied node identifier including at least one virtual node identifier as a virtual link between nodes including at least one virtual node and stores the corresponding virtual link identifier and the virtual link in the storage 3. The virtual link manager 14 retrieves the corresponding virtual link from the applied virtual link identifier.

The navigation manager 11 performs a navigation by taking a node identifier from the node manager 13 or a virtual node identifier from the virtual node manager 12, and by taking a link identifier from the link manager 15 or a virtual link identifier from the virtual link manager 14.

Figure 2:
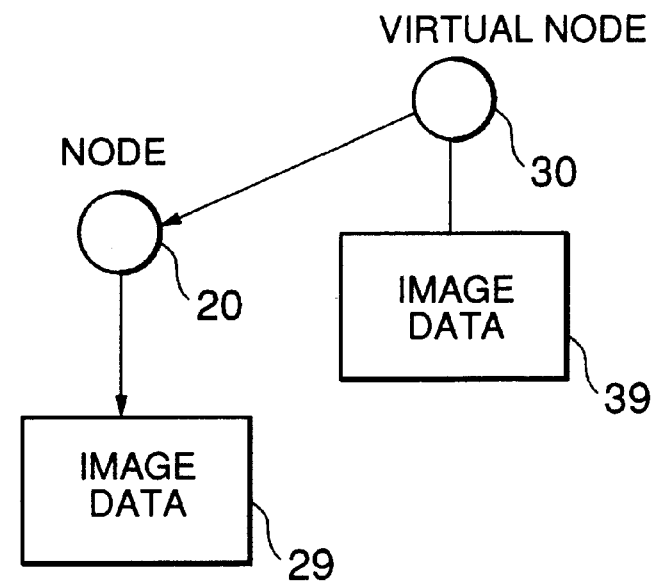
FIG. 2 is an illustrative view showing one example of a node and a virtual node in the first embodiment of the present invention.

Referring to FIG. 2, a node 20 corresponds to a certain data (i.e., an image data 29). A virtual node 30 of the node 20 corresponds to another data (i.e., an image data 39). In this case, the image data 39 is generated by applying a function (an operation) to the image data 29. The function includes rotation, deformation, and reverse, etc.

Figure 4:
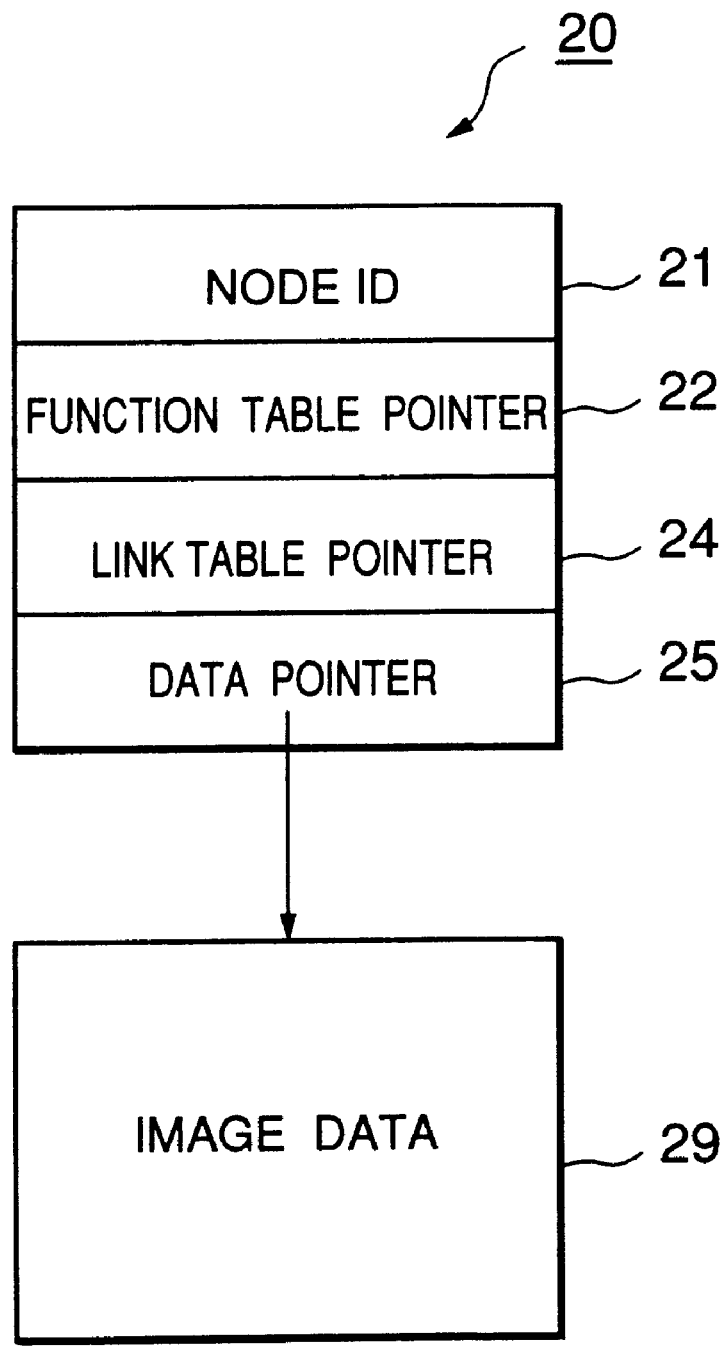
FIG. 4 is a data structure of the node in the first embodiment of the present invention.

Referring to FIG. 4, the node 20 has a node identifier 21, function table pointer 22, a link table pointer 24, and data pointer 25. The node identifier 21 identifies the node 20. The function table pointer 22 holds a starting address of a function index 40 (shown in FIG. 5). The link table pointer 24 holds a starting address of a link table 60 (shown in FIG. 7) for storing pairs of a link identifier and a node identifier. The data pointer 25 holds an address of an image data 29.

Figure 5:
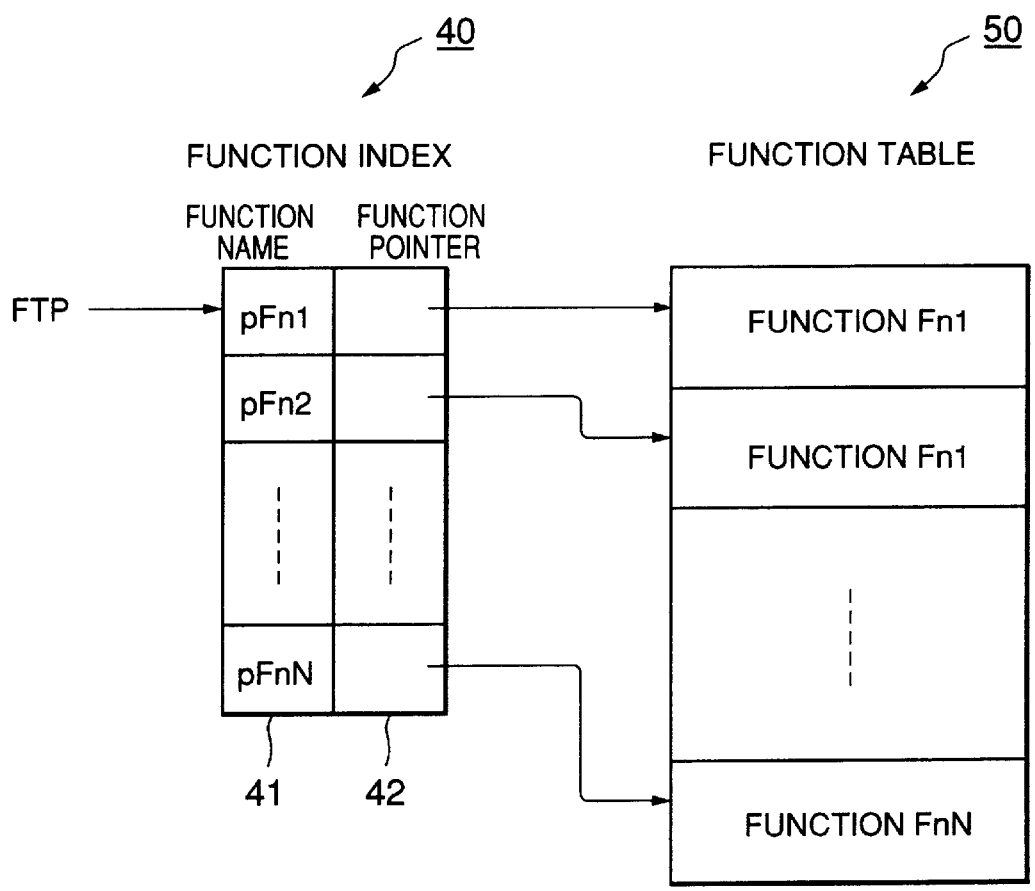
FIG. 5 is a data structure of a function index and a function table in the first embodiment of the present invention.

Referring to FIG. 5, the function index 40 pointed by function table pointer 22 has pairs of a function name 41 and a function pointer 42. The function name 41 is referenced to look-up a required function. The function pointer 42 holds an address in a function table 50. The function table 50 stores functions corresponds to the function index 40. These functions are applied to the image data 29.

Figure 6:
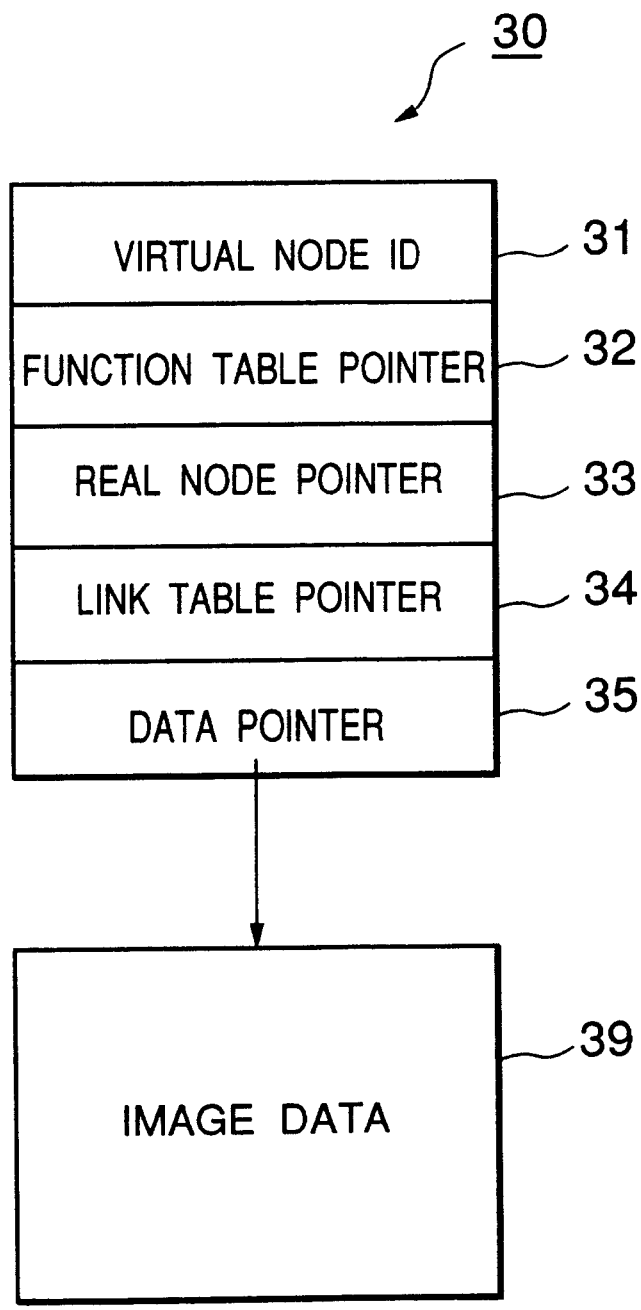
FIG. 6 is a data structure of the virtual node in the first embodiment of the present invention.

Referring to FIG. 6, the virtual node 30 has a virtual node identifier 31, a function table pointer 32, a real node pointer 33, a virtual link table pointer 34, and a data pointer 35. The virtual node identifier 31 identifies the virtual node 30. The function table pointer 32 holds a starting address of the function index 40 (shown in FIG. 5). The real node pointer 33 holds an address of the (corresponding real) node 20. The link table pointer 34 holds a starting address of the link table 60 (shown in FIG. 7). The data pointer 35 holds an address of the image data 39.

Figure 7:
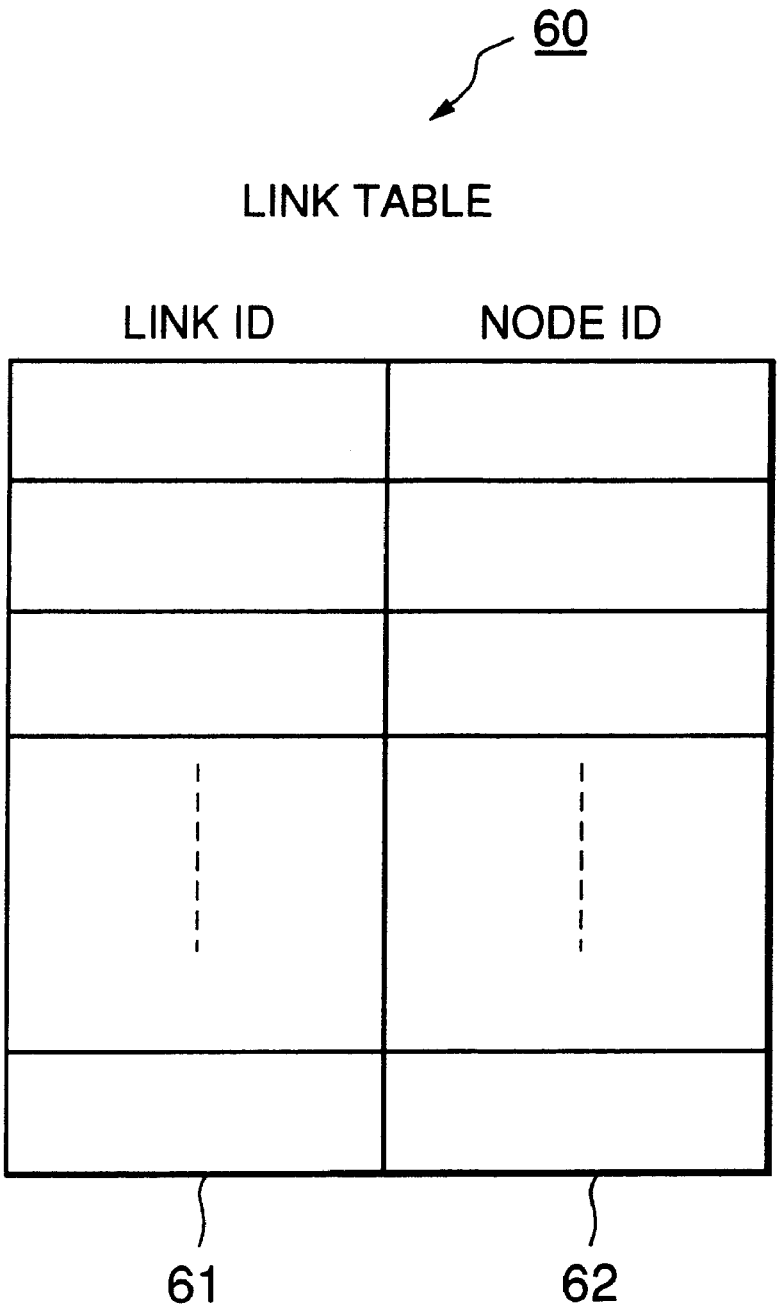
FIG. 7 is a data structure of a link table in the first embodiment of the present invention.

Referring to FIG. 7, the link table 60 stores pairs of a link identifier 61 and a node identifier 62. The link table 60 is used for searching a node identifier from a link identifier. The link table 60 is accessed with the link identifier 61, associatively (i.e., associative memory, or hashing).

The link identifier 61 may includes a virtual link identifier. The link table 60 may be divided into two tables; one is only for "real" links, and the other is only for virtual links.

Figure 8:
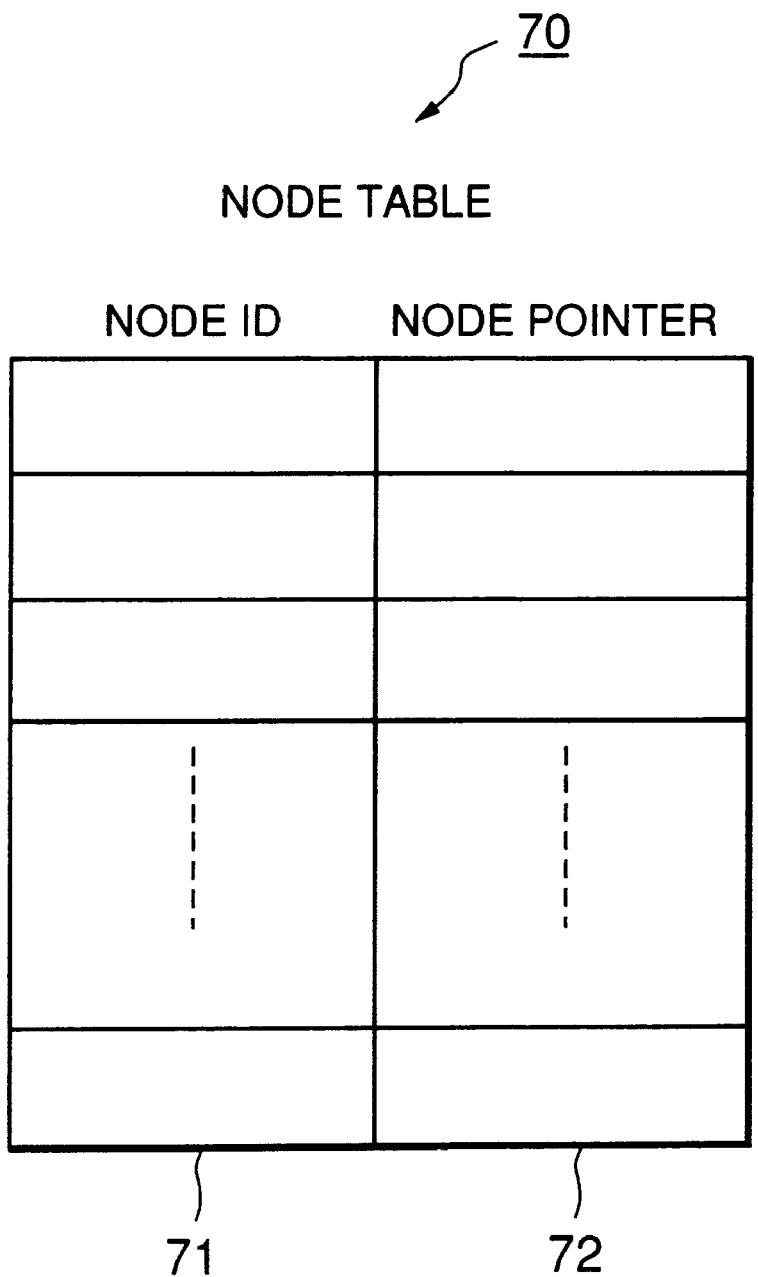
FIG. 8 is a data structure of a node table in the first embodiment of the present invention.

Referring to FIG. 8, the node table 70 stores pairs of a node identifier 71 and a node pointer 72 for holding an address of a node identifier (including a virtual node identifier). The node table 70 is used for searching a node pointer from a node identifier. The node table 70 is accessed with the node identifier 71, associatively (i.e., associative memory, or hashing).

Figure 9:
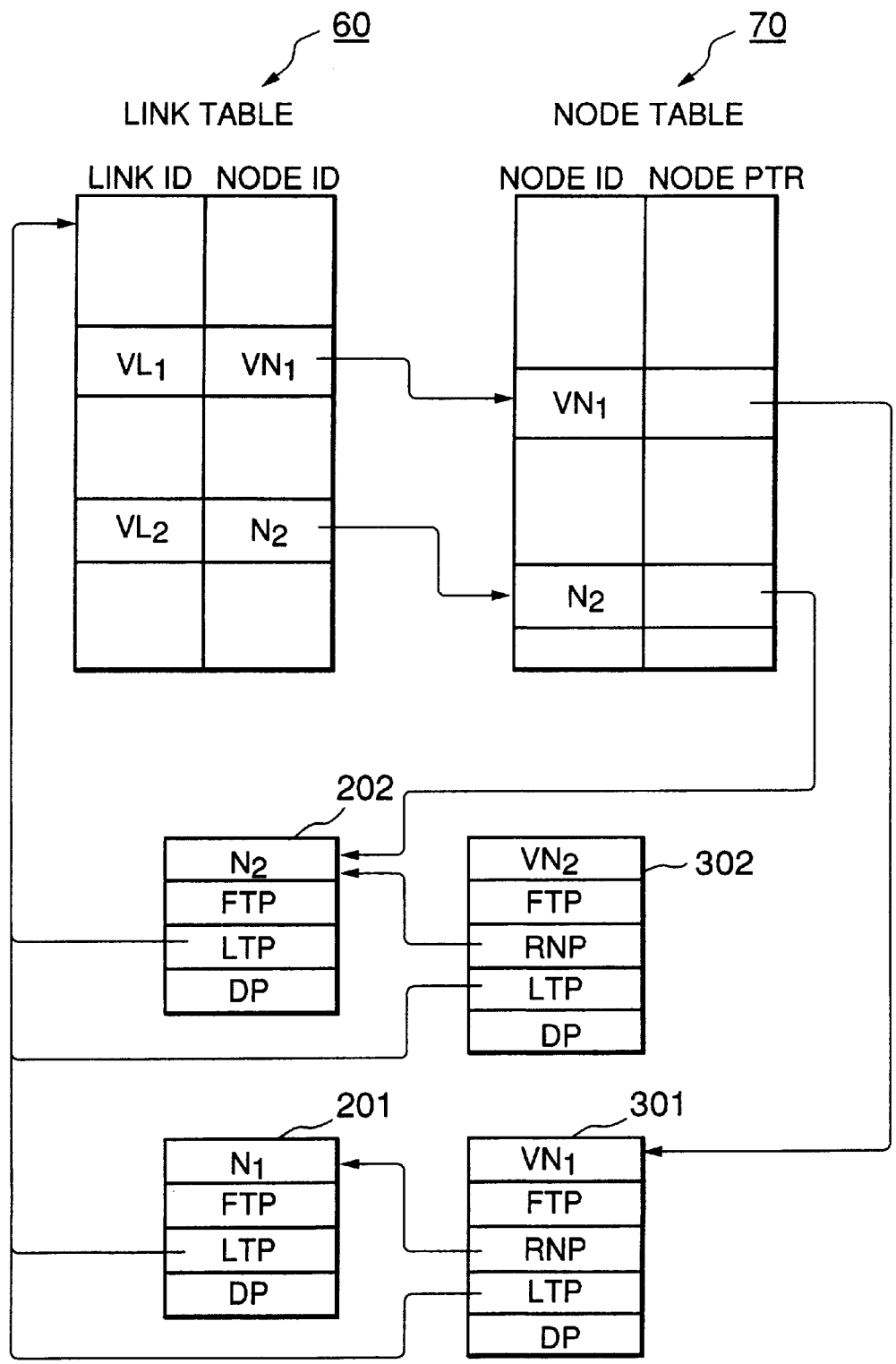
FIG. 9 is one example of the node and link in the first embodiment of the present invention.
Figure 10:
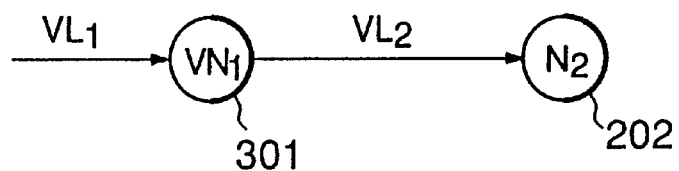
FIG. 10 is one example of the node and link shown in FIG. 9.

Referring to FIGS. 9 and 10, nodes 20 and 30 are related with the link table 60 and the node table 70. FIG. 10 shows relationship between the nodes of this example. A virtual link $VL_1$ points a virtual node $VN_1$ 301. A virtual link $VL_2$ links from the virtual node $VN_1$ to a (real) node N2 202.

Referring to FIG. 9, the virtual link $VL_1$ is searched in the link table 60 which indicates the virtual node $VN_1$ as a virtual node identifier. Then, the node table 70 is se arched for the virtual node $VN_1$ as a virtual node identifier. From the node table 70, the virtual node $VN_1$ 301 is retrieved.

To trace the next node, the link table 60 is addressed by the link table pointer. The virtual link $VL_2$ is searched in the link table 60 which indicates the node N2 as a node identifier. Then, the node table 70 is searched for the node N2 as a node identifier. From the node table 70, the node N2 202 is retrieved.

Figure 11:
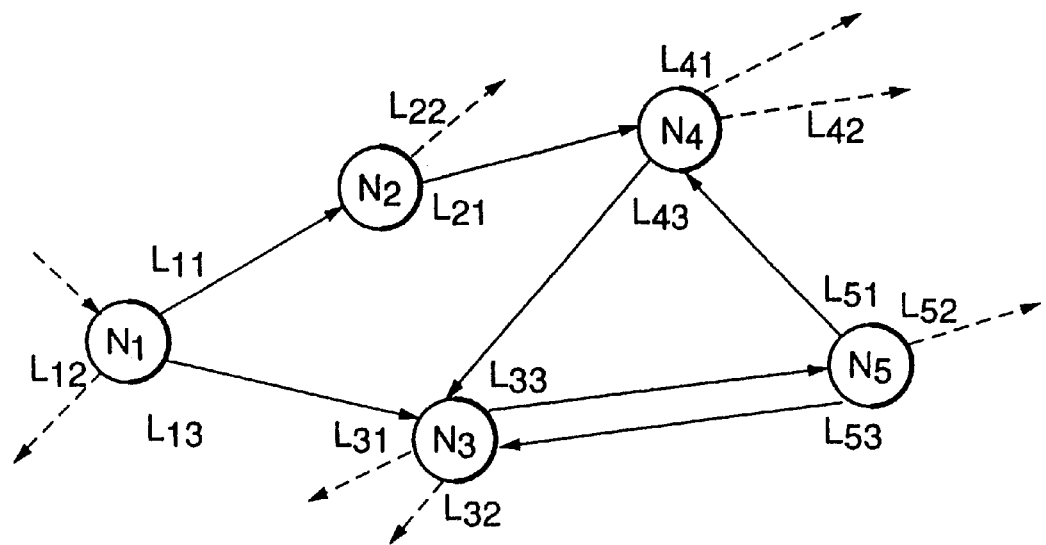
FIG. 11 is another example of the nodes and links in the first embodiment of the present invention.

Referring to FIG. 11, nodes $N_1$, $N_2$, $N_3$, and $N_4$ are linked by links (i.e., L13). For example, the node N1 is a starting node of the link L13.

Figure 12:
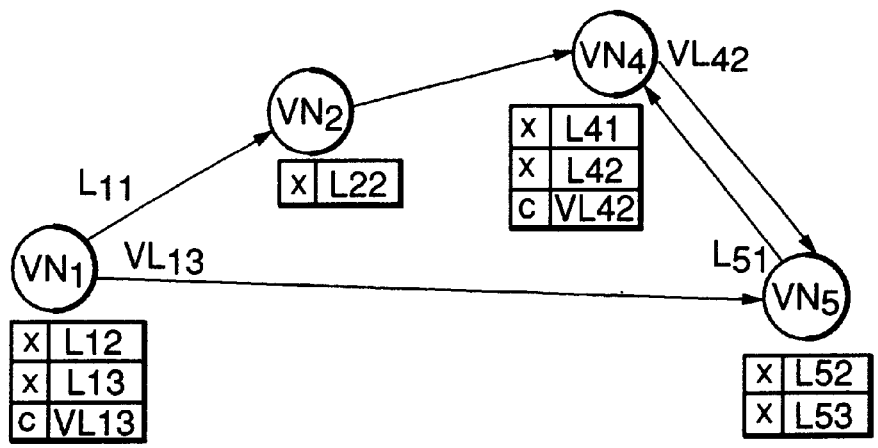
FIG. 12 is an illustrative view showing a virtual node in the first embodiment of the present invention.

Referring to FIG. 12, virtual nodes $VN_1$, $VN_2$, $VN_3$, and $VN_4$ are generated corresponding to the nodes $N_1$, $N_2$, $N_3$, and $N_4$ in FIG. 11. In order to define such a virtual node as above, it can be performed by applying a node identifier to the virtual node manager 12 and applying a definition of operation against the node manager 13. For example, $VN_1$ is made by applying the node identifier N1 and the node deletion operation "x" to $L_{12}$ and $L_{13}$ and further applying a node creation operation "c" for creating a new virtual node $VN_{13}$ to the node manager 13. Moreover, a virtual link from the virtual node $VN_{13}$ to the virtual node $VN_5$ is defined by the virtual link manager 14.

By creating the virtual node and the virtual link, the node $N_3$ is protected in the virtual hyper-media document, although the node $N_3$ is present in the original document. Since such a definition of the virtual hyper-media document as above can be performed with an instruction for the hyper-media document management system 1 of the present invention through the application programs 2, if the application program 2 dynamically defines the virtual hyper-media document, a certain limitation can be applied to a specified user to cause only a part of the hyper-media document to be displayed or to be modified. Moreover, since the virtual hyper-media document can be read or written between a plurality of application programs 2, only a specified part of the hyper-media document can be referred to other application program 2 by reloading a virtual hyper-media document dynamically.

Next, the navigation mechanism in the navigation manager 11 in the present invention will be described.

The application program 2 generates the virtual hyper-media data in FIG. 12 as a memory image. For example, the navigation manager 11 requests generation of the virtual node $VN_1$ to the virtual node manager 12 with a parameter "$VN_1$". The virtual node manager 12 requests reference to the node $N_1$ to the node manager 13. The node manager 13 performs a memory image generating operation corresponding to the node $N_1$ so as to read the media data into the memory, and returns a pointer corresponding to the memory image of the node $N_1$ back to the virtual node manager 12. The virtual node manager 12 can use subsequently the pointer given by the node manager 13 as a identifier "$N_1$" by relating the given pointer to the virtual node identifier.

The virtual node manager 12 also asks for a request to delete a reference of $L_{12}$ and $L_{13}$ to the virtual node manager 12 with a parameter of pointer corresponding to the node N1. As a result, when the node $N_1$ is referred through the virtual node $VN_1$, $L_{12}$ and $L_{13}$ acting as the partial nodes are not seen although the reference of $L_{12}$ and $L_{13}$ is held in the memory image of the node $N_1$. Moreover, the virtual node manager 12 creates a virtual link $VL_{13}$ corresponding to a part of the media data of the node $N_1$. The virtual node manager 12 requests definition of the virtual link to the virtual link manager 14 with parameters "$VL_{13}$" and "$VN_5$". Memory image creating process of the virtual node corresponding to $VN_5$ is performed in the same manner as that of the processing corresponding to $VN_1$.

In this way, when the related structure corresponding to that shown in FIG. 12 is made, the virtual node $VN_1$ is selected by a user, for example, a click operation is carried out on a display screen, the navigation manager 11 obtains the pointer for the virtual node $VN_1$. The navigation manager 11 can not refer to the partial nodes $L_{12}$ and $L_{13}$ of the node $N_1$ through the virtual node $VN_1$, so that a user does not select $L_{12}$ or $L_{13}$ and the user can select the virtual link $VL_{13}$ which is being newly made.

If such a virtual hyper-media document is made in advance in response to the application program, even if there is only one hyper-media document, either the node or the link which can be referred to for every virtual hyper-media document can be defined again, resulting in that it is possible to apply an access limitation against a user without revising the application program. That is, it is satisfactory to make a different virtual hyper-media document for a user having only a certain access authority. In general, since a procedure definition (i.e., making of application or revision of the application) is more time-consuming than a data definition (i.e., making a document), there is no problem to generate the virtual hyper-media documents.

In the first embodiment described above, the link table 60 can be divided into a (real) link table and a virtual link table. The node table 70 can be divided into a (real) node table and a virtual node table. Moreover, the storage 3 can be included in the hyper-media document management system 1.

In the first embodiment of the present invention, application program can operate a virtual hyper-media document having a virtual node and a virtual link. Since the virtual node is corresponded to one actual node without fail and the virtual link is corresponded to two combinations of a collection of the virtual node and the actual node, respectively, the prior art navigation can be performed and concurrently an operational limitation against the virtual link or the virtual node (i.e., setting of an access condition) can be stored in the storage. Due to this fact, the present invention can reduce a troublesome operation as found in the prior art that various access conditions had to be repeatedly set to change the hyper-media document or hyper-media application program every time the navigation for the hyper-media document management system was performed.

Next, a second embodiment of the hyper-media document management system according to the present invention will be described in detail with reference to the accompanying drawings.

Figure 13:
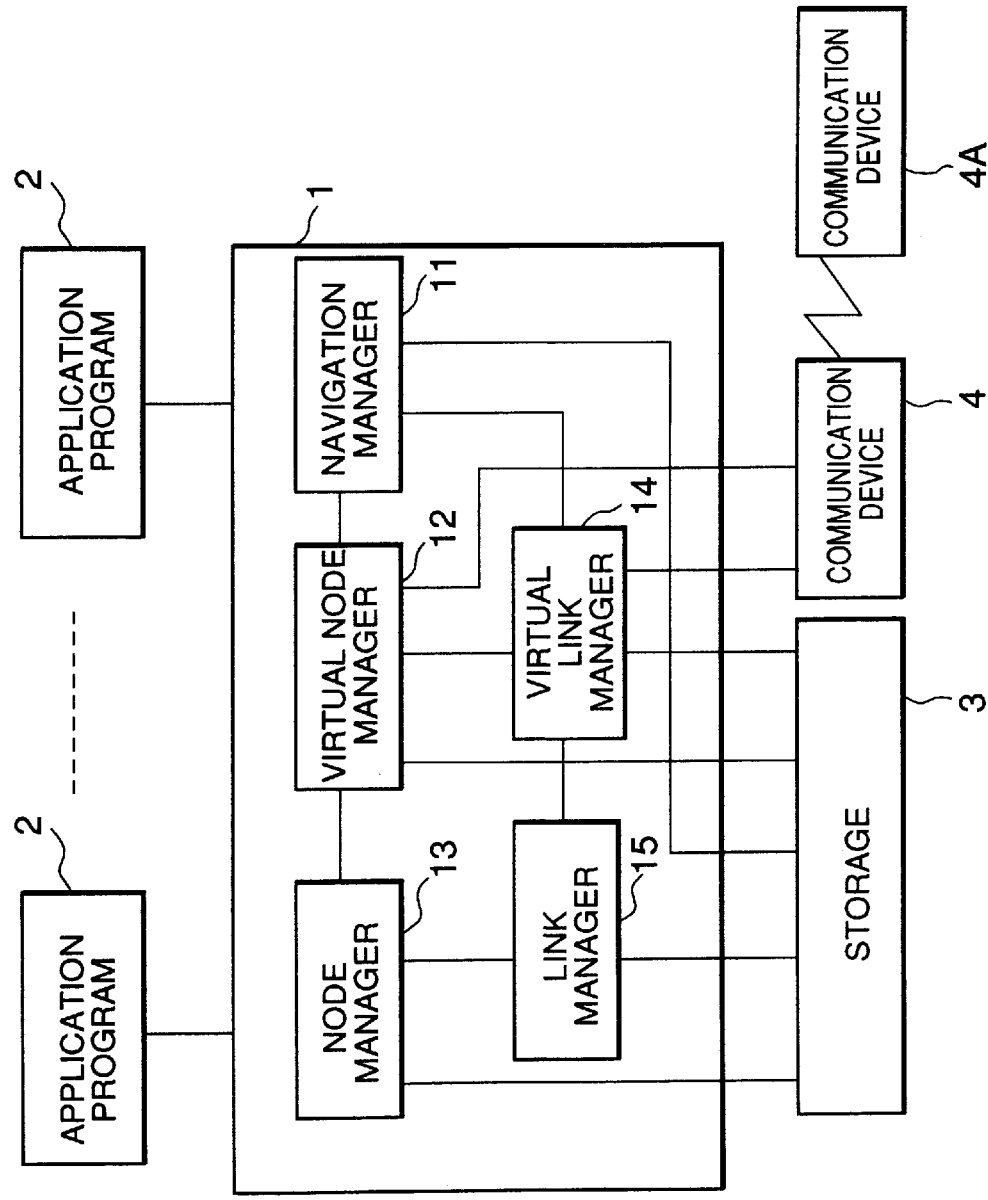
FIG. 13 is a block diagram showing the configuration of a second embodiment of a hyper-media document management system according to the present invention.

Referring to FIG. 13, in the second embodiment of the invention, a communication device 4 is added to the construction of the first embodiment. That is, a network function is loaded through the communication device 4 for the virtual node manager 12 and the virtual link manager 14.

Figure 3:
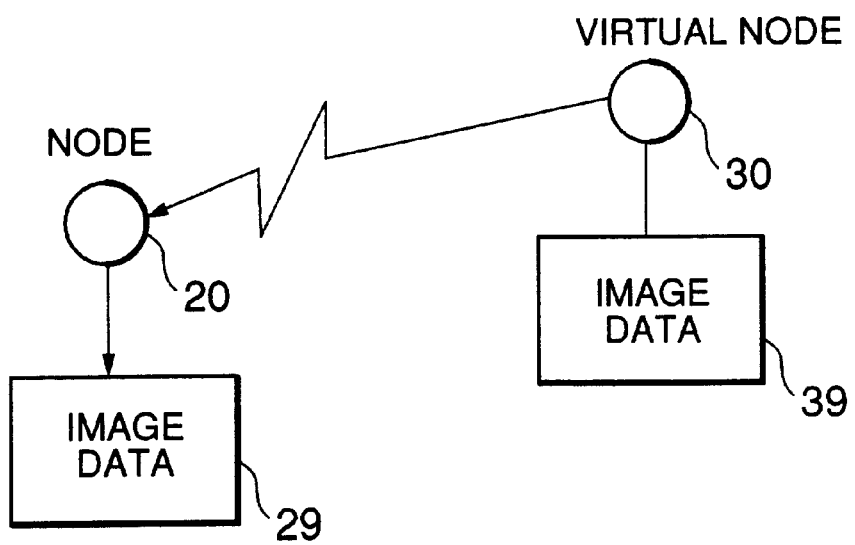
FIG. 3 is an illustrative view showing another example of the node and the virtual node in the first embodiment of the present invention.

Referring to FIG. 3, the node 20 can be stored in a different system on the network from the virtual node 30. In this case, the virtual node 30 has a location information (i.e., disk address, or network address). The virtual node 30 has a function to refer to another system on the network or to refer to the node held by another system.

Figure 14:
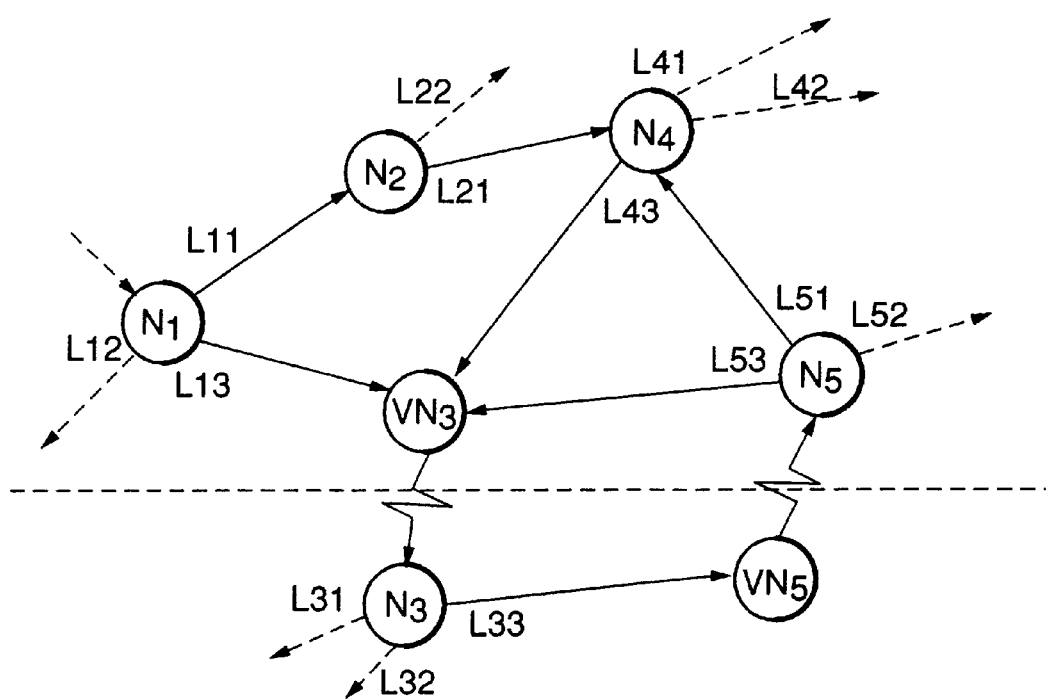
FIG. 14 is one example of the nodes and links of the second embodiment of the present invention.

Referring to FIG. 14, a dotted line indicates a system interface. For example, a node $N_3$ is located in different system from a virtual node $VN_3$; the node N3 refers to the node $N_5$ from the virtual node $VN_5$.

By using the virtual node creating function and the virtual node referring function of the virtual node manager 12, the virtual node manager 12 create a virtual node referring to a certain node in the hyper-media document which is present on the network. A link with the created virtual node being applied as a target is made such that the existing nodes (i.e., $L_{13}$, $L_{43}$, and $L_{53}$) are applied as starting point nodes. In this way, it is possible to embed the virtual node corresponding to the node held by the hyper-media document of another machine to the hyper-media document which is present on a certain system on the network.

Referring to FIG. 14, when the virtual node manager 12 on the system holding the related structure higher than the dotted line creates a memory image of the virtual node VN3, the virtual node manager 12 holds a set of a network address of the system having the node $N_3$ and the node identifier $N_3$, instead of holding a pointer for the node $N_3$. In the case that the virtual node VN3 is referred to for the first time upon request from a application program, a processing for creating the memory image corresponding to the node $N_3$ is requested to the node manager of the system corresponding to the network address with the node identifier $N_3$ as a parameter. The requested node manager 13 may create the memory image of the node $N_3$ and returns a version number of the created memory image to the virtual node manager 12 of the requesting system. The virtual node manager 12 receives the version number, and stores the version number in the memory image of the virtual node $VN_3$. This version number is revised every time the content held by the node $N_3$ is revised by the node manager 13 of the system below the dotted line in FIG. 14.

After the virtual node $VN_3$ is created in this way, the navigation manager 11 uses the version number when the memory image of the virtual node $VN_3$ is referred to and confirms a presence or a non-presence of the revision of the node $N_3$. As means for keeping a consistency of the reference data using such a version number as above, it is possible to apply conventional methods. It may also be easily assumed that for example, when the node $N_3$ is referred to for the first time, the displaying data (i.e., rendering data) for use in displaying the node $N_3$ on a screen is returned and every time the node N3 is revised, the revision number of the node $N_3$ is broadcasted to the system referring to the node $N_3$, thereby a system having a former revision number may request to get the revised data.

Furthermore, when the navigation manager 11 obtains an operation corresponding to the virtual node $VN_3$ in response to the operation from an application program, all the operations are transferred to the node manager 13 on the network related to the virtual node identifier $VN_3$ through the virtual node manager 12.

In the second embodiment described above, the link table 60 can be divided into a (real) link table and a virtual link table. The node table 70 can be divided into a (real) node table and a virtual node table. Moreover, the storage 3 and the communication device 4 can be included in the hyper-media document management system 1.

Next, a third embodiment of the hyper-media document management system according to of the present invention will be described in detail with reference to the accompanying drawings.

Figure 15:
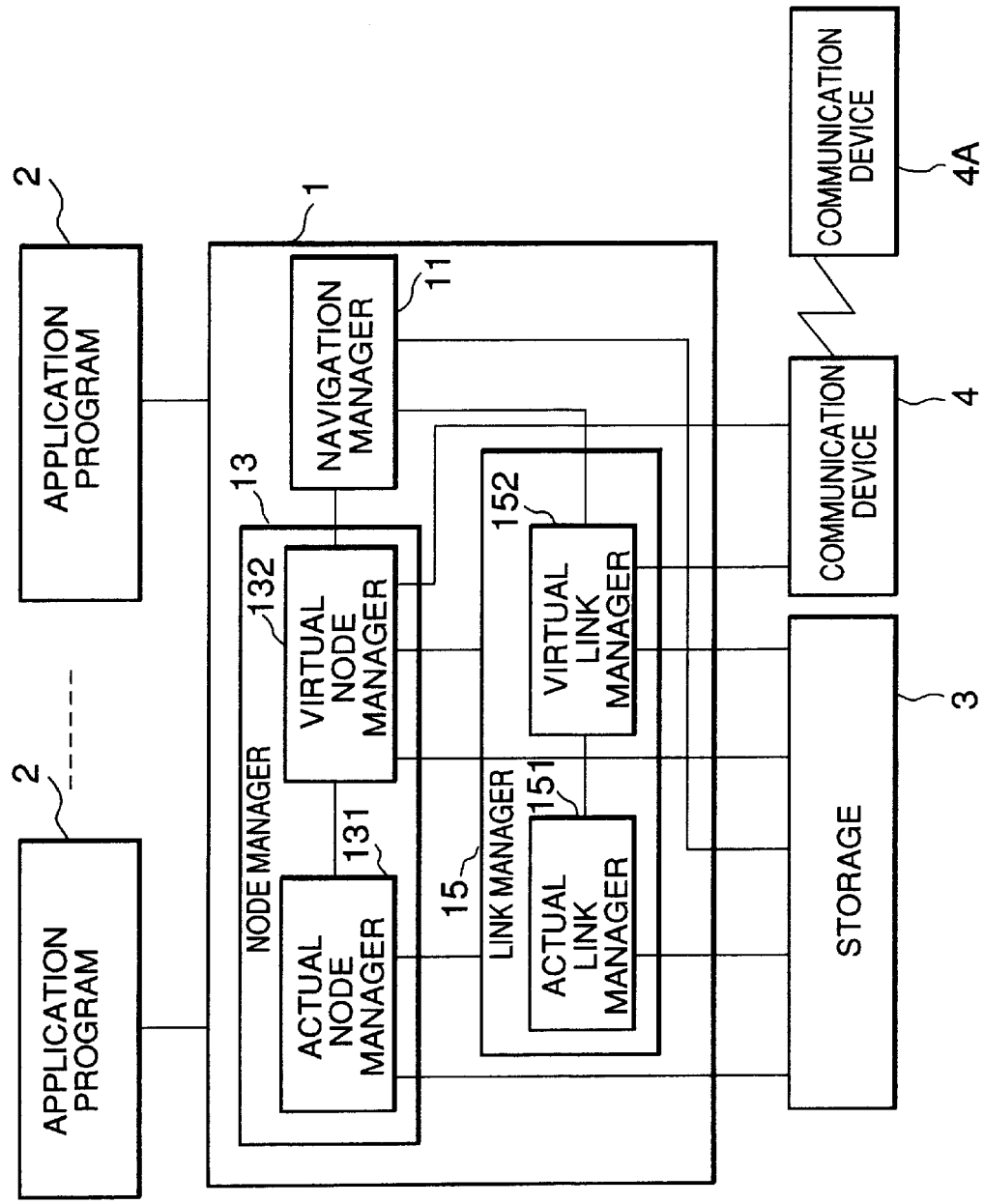
FIG. 15 is a block diagram showing the configuration of a third embodiment of a hyper-media document management system according to of the present invention.

Referring to FIG. 15, a node manager 13 includes an actual (real) node manager 131 and a virtual node manager 132; a link manager 15 includes an actual (real) link manager 151 and a virtual link manager 152. The actual node manager 131 works in the same way as the node manager 13 of the first embodiment. The virtual node manager 132 works in the same way as the virtual node manager 12 of the first embodiment. The actual link manager 151 works in the same way as the link manager 15 of the first embodiment. The virtual link manager 152 works in the same way as the virtual link manager 14 of the first embodiment. With such a system as above, the function of management and navigation of the virtual hyper-media document of the present invention can be utilized without changing the implementation of the application program 2 using the existing interface.

As is apparent from the above description, according to the present invention, it is possible to create, delete, store and read out the virtual hyper-media document when the navigation is performed by introducing the data structures such as virtual node and virtual link to either the node or the link defining the configuration of the hyper-media document.

Moreover, since a plurality of virtual nodes can be related to one actual node, a plurality of virtual hyper-media documents referring to one actual node are related during the navigation operation.

Furthermore, the present invention has an advantage that it becomes possible to define a limitation in operation for the same hyper-media document by defining the executing procedure related to the virtual node as a readable module during execution of the application.

While the invention has been described in terms of several preferred embodiments, those skilled in the art will recognize that the invention can be practiced with modification within the spirit and scope of the appended claims.

What is claimed is:

1. A hyper-media document management system, comprising:
   a document manager for managing a hyper-media document;
   a virtual document manager for managing virtual hyper-media documents corresponding to said hyper-media document, and for providing said virtual hyper-media documents to corresponding application programs, said virtual document manager changing each of said virtual hyper-media documents from what said hyper-media document is, in response to corresponding application programs; and
   a navigation manager for tracing said hyper-media document and said virtual hyper-media documents.

2. The hyper-media document management system according to claim 1, said document manager further comprising:
   a node manager for managing nodes indicating media data in said hyper-media document; and
   a link manager for managing links indicating a relationship between pairs of said nodes.

3. The hyper-media document management system according to claim 1, said virtual document manager further comprising:
   a virtual node manager for managing virtual nodes in said virtual hyper-media document, said virtual nodes indicating instances of said nodes; and
   a virtual link manager for managing virtual links indicating a relationship between pairs of said nodes and said virtual nodes.

4. A hyper-media document management system, comprising:
   a storage for storing a hyper-media document and a virtual hyper-media document which includes a change from what said hyper-media documents is, wherein said change is made in response to each of application programs;
   a document manager for managing said hyper-media document;
   a virtual document manager for managing virtual hyper-media documents which are respectively provided to the application programs, and for providing said virtual hyper-media documents to corresponding application programs, said virtual document manager changing each of said virtual hyper-media documents from what said hyper-media document is, in response to corresponding application programs; and
   a navigation manager for tracing said hyper-media document and said virtual hyper-media document.

5. The hyper-media document management system according to claim 4, wherein:
   said hyper-media document stored in said storage comprises nodes for indicating media data and links indicating relationship between pairs of said nodes; and
   said virtual hyper-media document stored in said storage comprises virtual nodes for indicating instances of said nodes and virtual links indicating a relationship between pairs of said nodes and said virtual nodes.

6. The hyper-media document management system according to claim 5, further comprising:
   a communication device for communicating with another hyper-media document management system to trace said hyper-media media document and said virtual hyper-media document.

7. The hyper-media document management system according to claim 5, wherein said storage further stores a link table for storing a relationship between one of said links and said virtual links and one of said nodes and said virtual nodes.

8. The hyper-media document management system according to claim 5, wherein said storage further stores a node table for storing relationship between said nodes and addresses of said nodes or said virtual nodes and addresses of said virtual nodes in said storage.

9. The hyper-media document management system according to claim 5, wherein said storage further stores a function table for storing functions to be applied to said nodes to create said virtual nodes.

10. A hyper-media document management system, comprising:
   a storage for storing a hyper-media document having nodes for indicating media data and links indicating a relationship between pairs of said nodes, and for storing virtual hyper-media documents, each of which includes a change from what said hyper-media document is and each of which is provided to each of corresponding application programs, having virtual nodes for indicating instances of said nodes and virtual links indicating a relationship between pairs of said nodes and said virtual nodes, wherein said change is made in response to each of the application programs;
   a virtual document manager for managing said virtual hyper-media documents which are respectively provided to the application programs, and for providing said virtual hyper-media documents to corresponding application programs, said virtual document manager changing each of said virtual hyper-media documents from what said hyper-media document is, in response to corresponding application programs, said virtual document manager comprising: a node manager for managing said nodes of said hyper-media document and said virtual links of said virtual hyper-media document, and a link manager for managing said links of said hyper-media document and said virtual links of said virtual hyper-media document; and a navigation manager for tracing said hyper-media document and said virtual hypermedia documents.

11. The hyper-media document management system according to claim 10, further comprising:

a communication device for communicating with another hyper-media document management system to trace said hyper-media document and said virtual hyper-media document.

12. The hyper-media document management system according to claim 10, wherein said storage further stores a link table for storing a relationship between one of said links and said virtual links and one of said nodes and said virtual nodes.

13. The hyper-media document management system according to claim 10, wherein said storage further stores a node table for storing a relationship between said nodes and addresses of said nodes or said virtual nodes and addresses of said virtual nodes in said storage.

14. The hyper-media document management system according to claim 10, wherein said storage further stores a function table for storing functions to be applied to said nodes to create said virtual nodes.

15. A computer-readable storage medium recording thereon a program enabling a computer to perform:

a document managing processing for managing a hyper-media document;

a virtual document managing processing for managing virtual hyper-media documents corresponding to said hyper-media document, and for providing said virtual hyper-media documents to corresponding application programs, said virtual document managing processing changing each of said virtual hyper-media documents from what said hyper-media document is, in response to corresponding application programs; and a navigation managing processing for tracing said hyper-media document and said virtual hyper-media documents.

16. A computer-readable storage medium recording thereon a program enabling a computer to perform:

a storing processing for storing a hyper-media document and a virtual hyper-media document which includes a change from what said hyper-media document is, wherein said change is made in response to each of application programs:

a document managing processing for managing said hyper-media document;

a virtual document managing processing for managing said virtual hyper-media documents which are respectively provided to the application programs, and for providing said virtual hyper-media documents to corresponding application programs, said virtual document managing processing changing each of said virtual hyper-media documents from what said hyper-media document is in response to corresponding application programs; and a navigation managing processing for tracing said hyper-media document and said virtual hyper-media documents.

17. A hyper-media document management system, which manages hyper-media documents each including a plurality of nodes corresponding to media data and having a linkage information and function information to be applied to said media data, said system comprising:

a virtual node manager for managing a virtual node, which corresponds to said node, together with a virtual link information indicating a tracing information for said virtual node and a function information to be applied to said media data as a virtual node; and a virtual hyper-media document manager for managing a virtual hyper-media document including at least one said virtual node in response to an application program in accordance with said virtual link information and function information to be applied to said media data as a virtual node.

* * * * *